United States Patent
Nozaki

(10) Patent No.: US 8,004,603 B2
(45) Date of Patent: Aug. 23, 2011

(54) CAMERA WITH AN INTERRUPTING UNIT, AND CAMERA WITH AN INHIBITING UNIT

(75) Inventor: Hirotake Nozaki, Tokyo (JP)

(73) Assignee: Nikon Corporation, Tokyo (JP)

( * ) Notice: Subject to any disclaimer, the term of this patent is extended or adjusted under 35 U.S.C. 154(b) by 387 days.

(21) Appl. No.: 12/153,875

(22) Filed: May 27, 2008

(65) Prior Publication Data

US 2008/0252772 A1     Oct. 16, 2008

Related U.S. Application Data

(63) Continuation of application No. 10/365,547, filed on Feb. 13, 2003, now abandoned.

(30) Foreign Application Priority Data

Feb. 15, 2002    (JP) ................................ 2002-038976
Feb. 15, 2002    (JP) ................................ 2002-038977

(51) Int. Cl.
*H04N 5/225* (2006.01)
*H04N 5/222* (2006.01)

(52) U.S. Cl. ............... 348/376; 348/207.99; 348/333.13

(58) Field of Classification Search .......... 348/373–376, 348/362–366, 207.99, 220.1, 333.01, 333.02, 348/333.04, 333.13
See application file for complete search history.

(56) References Cited

U.S. PATENT DOCUMENTS

| | | | |
|---|---|---|---|
| 5,903,706 A * | 5/1999 | Wakabayashi et al. | ....... 348/373 |
| 6,445,417 B1 | 9/2002 | Yoshida et al. | |
| 6,963,368 B1 | 11/2005 | Shibazaki | |
| 7,012,638 B1 * | 3/2006 | Yokonuma | ............... 348/207.99 |

FOREIGN PATENT DOCUMENTS

| JP | A-63-018873 | | 1/1988 |
|---|---|---|---|
| JP | A-02-224107 | | 9/1990 |
| JP | A-04-329506 | | 11/1992 |
| JP | 05-007322 | * | 1/1993 |
| JP | A-05-007322 | | 1/1993 |
| JP | A-05-011331 | | 1/1993 |
| JP | 05-095501 | * | 4/1993 |

(Continued)

OTHER PUBLICATIONS

Office Action issued in U.S. Appl. No. 12/232,062; mailed Oct. 12, 2010.

*Primary Examiner* — Nhan T Tran

(74) *Attorney, Agent, or Firm* — Oliff & Berridge, PLC

(57) ABSTRACT

When at least a portion of an aperture of a lens part is covered with some object, both adjusting of the sensitivity of an image pickup part and display of "though image" are inhibited. Also, it is able to shorten a length of time for which the camera enters into a power saving mode, and to prevent capture of improper images. Provided herein is a determining unit for determining whether at least a portion of the aperture of the lens part is covered. When the determining unit determines that it is covered, the camera inhibits the sensitivity adjustment of the image pickup part and the display of "though image", shortens the length of time after which the camera enters into the power saving mode, interrupts shooting or continuous shooting, or a movie imaging, and inhibits a flash emission.

3 Claims, 13 Drawing Sheets

FOREIGN PATENT DOCUMENTS

| | | |
|---|---|---|
| JP | A-05-095501 | 4/1993 |
| JP | A-05-153454 | 6/1993 |
| JP | A-07-212640 | 8/1995 |
| JP | A-07-288737 | 10/1995 |
| JP | A-10-243266 | 9/1998 |
| JP | A-11-069213 | 3/1999 |
| JP | A-11-149105 | 6/1999 |
| JP | A-11-220684 | 8/1999 |
| JP | A-11-234544 | 8/1999 |
| JP | A-2000-013672 | 1/2000 |
| JP | A-2000-175088 | 6/2000 |
| JP | A-2000-350090 | 12/2000 |
| JP | A-2001-128041 | 5/2001 |
| JP | A-2001-235674 | 8/2001 |

* cited by examiner

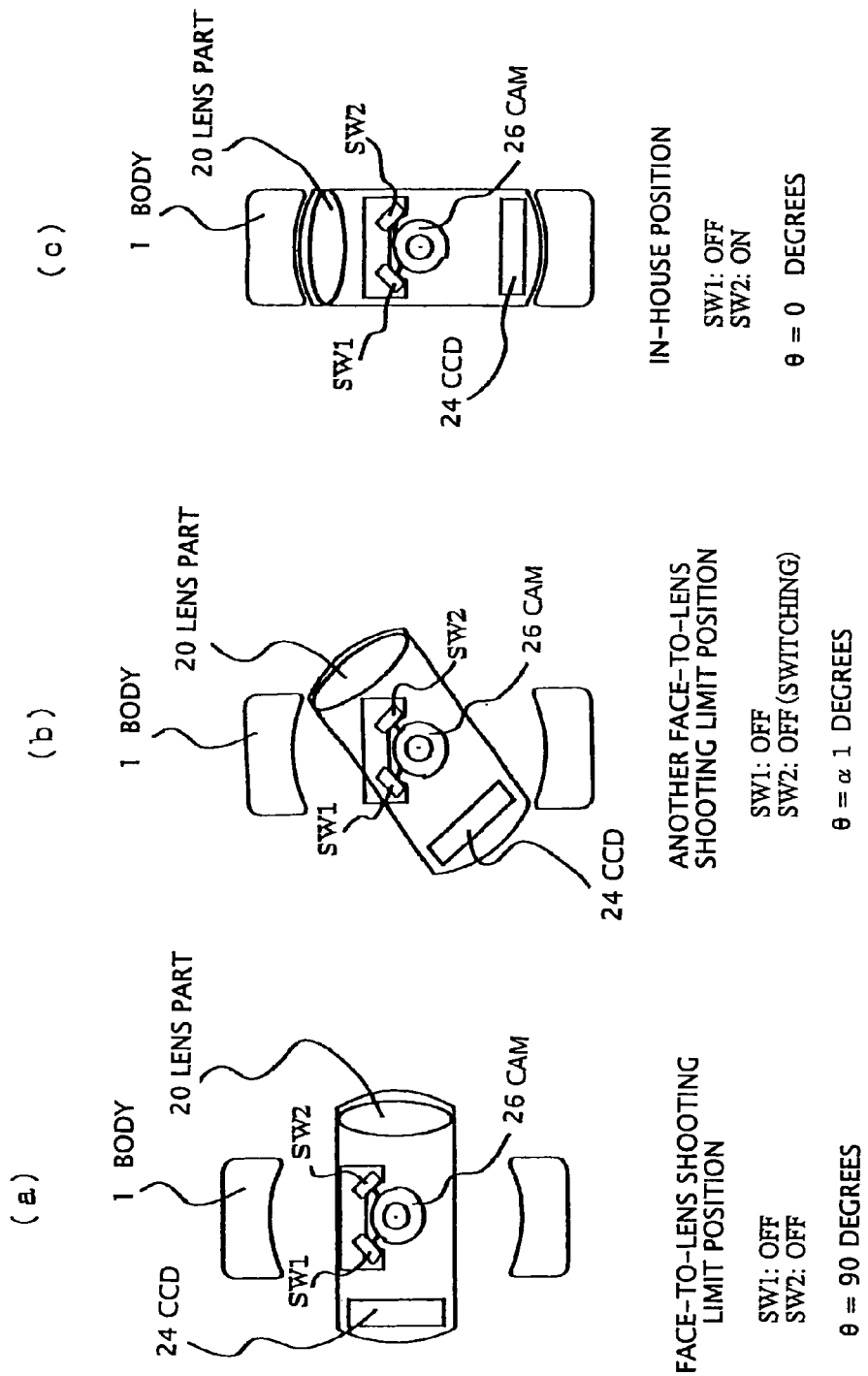

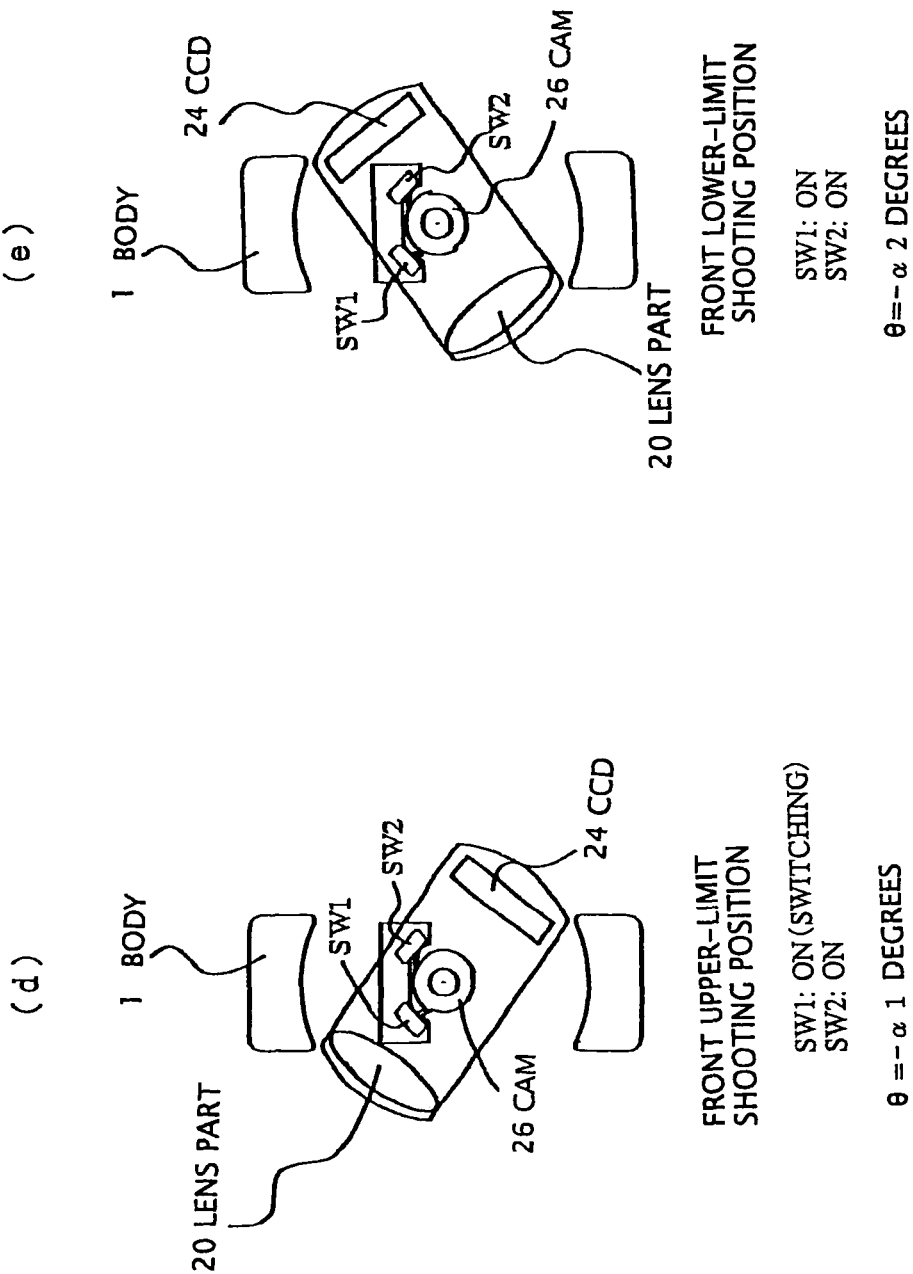

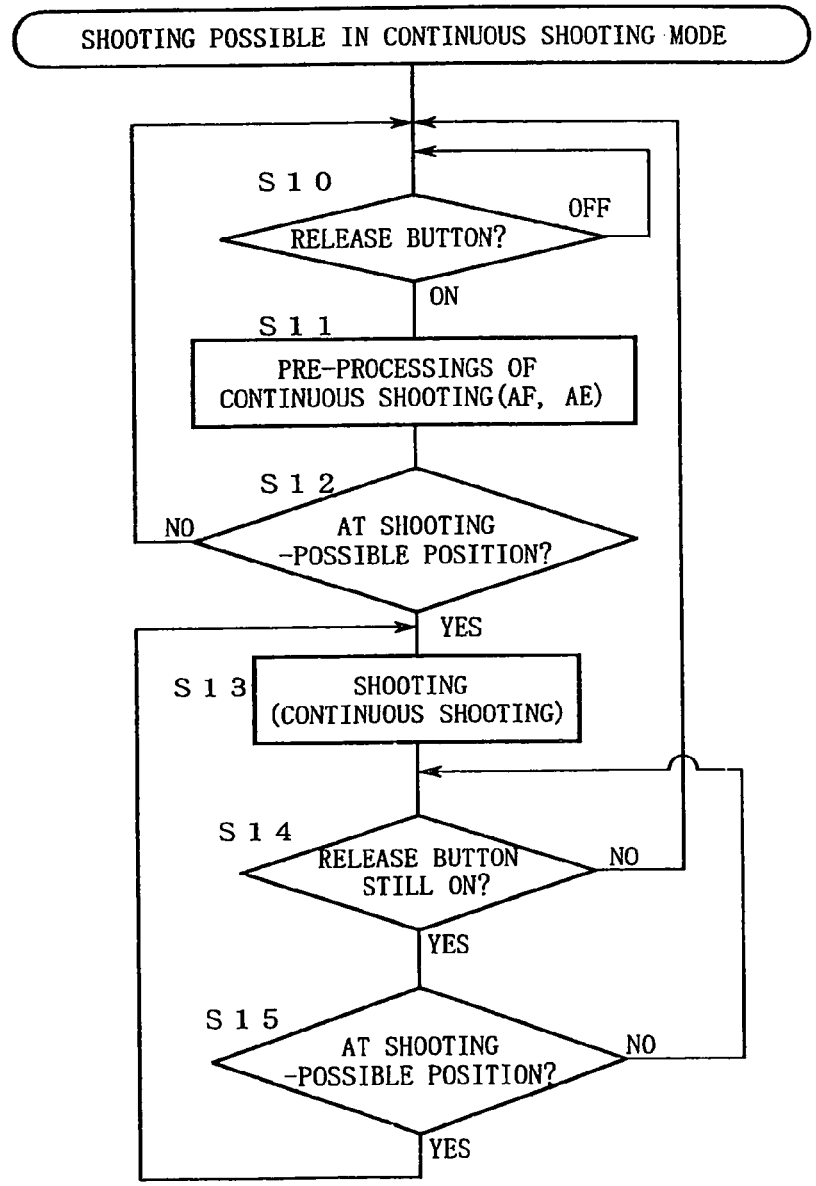

CAMERA WITH AN INTERRUPTING UNIT, AND CAMERA WITH AN INHIBITING UNIT

This is a Continuation of application Ser. No. 10/365,547 filed Feb. 13, 2003, which claims the benefit of Japanese Application No. 2002-038976 filed Feb. 15, 2002 and Japanese Application No. 2002-038977 filed Feb. 15, 2002. The disclosures of the prior applications are hereby incorporated by reference herein in their entirety.

BACKGROUND OF THE INVENTION

1. Field of the Invention

The present invention relates to an electronic camera that uses an image pickup part such as a CCD or the like to image a subject, and stores the image data on a recording medium. The present invention also relates to a camera that images a subject and captures the image thereof on a silver film. It should be noted that the term "camera", if simply referred to herein, refers to both of an electronic camera and a camera that captures images on a silver film.

2. Description of the Related Art

An electronic camera, when its release button's being half-pressed, automatically decides exposure conditions (this operation will be referred to as "AE" hereinafter) and adjusts the focus by auto focusing (this operation will be referred to as "AF" hereinafter). Thereafter, with its release button being full-pressed the electronic camera shoots an image.

Upon the release button's being half-pressed, the exposure conditions are accurately decided by the AE processing, and accurate focus adjustment is made by the AF processing unless any object (e.g., a lens cap, a camera case or the like) covers even a portion of an aperture of a lens part.

The electronic camera has a continuous shooting mode for continuous shooting and a movie imaging mode for movie imaging.

The electronic camera prepares for a flash emission when its release button is half-pressed and the brightness of the subject light is insufficient, or when its flash part has been set to emit a flash. Thereafter, the electronic camera, upon its release button's being full-pressed, emits a flash to shoot the subject.

The electronic camera has a function of automatically adjusting the sensitivity of its image pickup part such as a CCD in accordance with the brightness of a subject so as to shoot the subject even when the brightness of the subject is low.

The electronic camera also has a "through image" display function of displaying on the liquid crystal monitor the image of a subject which the image pickup part is presently imaging (the "through image" helps the camera operator check the image to be captured). The camera is also structured to enter into a power saving mode in which it standbys with minimum power consumption when it is powered on but not in operation for a predetermined period of time.

In a case where the setting of the exposure and the focus adjustment has been done with the release button half-pressed, and thereafter, even a portion of the lens aperture of the camera gets covered with some object (e.g., a lens cap, a camera case or the like) when the release button full-pressed, (i.e., so-called vignetting occurs), the camera of the prior art disadvantageously takes inappropriate pictures because it performs shooting with conditions (AE and AF processing) which are to be set when the release button half-pressed.

In addition, if even a portion of the lens aperture of the electronic camera gets covered with some object (e.g., a lens cap, a camera case or the like) while the electronic camera is shooting in a continuous shooting mode (if vignetting occurs), the electronic camera of the prior art disadvantageously continues to take inappropriate pictures thereafter.

Similarly, if even a portion of the lens aperture of the electronic camera gets covered with some object (e.g., a lens cap, a camera case or the like) while the electronic camera is shooting in a movie imaging mode (if vignetting occurs), the electronic camera of the prior art disadvantageously continues to take inappropriate movie images thereafter.

The electronic camera of the prior art as stated above prepares for a flash emission upon its release button half-pressed, when the brightness of the subject is insufficient, or when it has been set to flash light. In such a case, even if a portion of the aperture of the lens part of the camera is covered with by some object (e.g., a lens cap, a camera case or the like) (even if vignetting occurs), the flash part flashes light. At this moment, the object covering the light emitting part of the flash part limits the space which is to be affected by the flash emission. This may cause a deformation of a structure between the camera case and the light emitting part, for example, due to the heat. The heat may also result in shortening the life of the electronic camera, and may have an adverse effect on the human body.

Further, in the prior art if at least a portion of the aperture of the lens part of the electronic camera gets covered with some object (e.g., a lens cap, a camera case or the like) (if a vignetting occurs), the electronic camera automatically raises the sensitivity of the image pickup part up to be ready for the shooting, which results in producing inappropriate pictures.

Still further, it is disadvantageous that if at least a portion of the aperture of the lens part of the electronic camera gets covered with some object (e.g., a lens cap, a camera case or the like) with a "through image" displayed on the liquid crystal monitor (if a vignetting occurs), it continuously displays inappropriate images on the liquid crystal monitor thereafter. In such a case, there arises a problem that the larger the covered portion of the aperture is, the greater the amount of noise included in the displayed image is.

Moreover, the camera is structured to enter into a power saving mode in which it standbys with minimum power consumption when it is powered on but not in operation for a predetermined period of time, as stated above. However, if at least a portion of the aperture of the lens part of the camera gets covered with some object (e.g., a lens cap, a camera case or the like) (if a vignetting occurs), good images cannot be produced. This will lead to another problem of unnecessary power consumption because the electronic camera does not enter into the power saving mode until the predetermined period of time elapses.

SUMMARY OF THE INVENTION

It is an object of the present invention to provide an electronic camera that is capable of determining whether or not a proper shooting can be performed upon its release button's being full-pressed, in order to inhibit the shooting operation if no proper shooting is feasible.

It is another object of the present invention to provide an electronic camera that is capable of determining during continuous shooting whether or not a proper shooting can be performed, in order to inhibit the continuous shooting if no proper shooting is feasible.

It is still another object of the present invention to provide an electronic camera capable of determining, while a movie is being imaged, whether or not a proper movie imaging can be performed, in order to inhibit the movie imaging processing if no proper movie imaging is feasible.

It is still another object of the present invention to provide an electronic camera capable of determining, prior to flashing from the flash part, whether at least a portion of the aperture of the lens part of the camera is covered with some object, in order to inhibit the shooting processing if covered.

It is still another object of the present invention to provide an electronic camera that is capable of determining whether at least a portion of the aperture of the lens part of the camera is covered with some object (e.g., a lens cap, a camera case or the like) to control adjustment of sensitivity of the image pickup part based on the determination result.

It is still another object of the present invention to provide an electronic camera that is capable of determining, while a "through image" being displayed on the liquid crystal monitor, whether at least a portion of the aperture of the lens part of the camera is covered with some object (e.g., a lens cap, a camera case or the like), to control the display of the "through image" based on the determination result.

It is still another object of the present invention to provide a camera being capable of determining whether at least a portion of the aperture of the lens part of the camera is covered with some object (e.g., a lens cap, a camera case or the like), to select one of predetermined durations of time for the power saving mode according to the determination result.

In order to accomplish the foregoing objects, an electronic camera of the present invention has: a lens part; a covering unit for covering at least a portion of an aperture of the lens part; a determining unit for determining whether at least a portion of the aperture of the lens part is covered with the covering unit; a release button for setting a shooting condition when half-pressed, and for executing a shooting when being full-pressed; and a shooting inhibiting unit for inhibiting the shooting of an image when the determining unit determines that at least a portion of the aperture of the lens part is covered upon the release button's being full-pressed.

The present invention makes it possible to determine whether at least a portion of the aperture of the lens part is covered when the release button is full-pressed.

In order to accomplish the foregoing objects, an electronic camera of the present invention has: a lens part; a covering unit for covering at least a portion of an aperture of the lens part; a determining unit for determining whether at least a portion of the aperture of the lens part is covered with the covering unit; a continuous shooting unit for performing continuous shooting; and a continuous shooting interrupting unit for interrupting continuous shooting of the continuous shooting unit when the determining unit determines, during the continuous shooting, that at least a portion of the aperture of the lens part is covered. It is preferable that the continuous shooting interrupting unit resumes continuous shooting when the determining unit determines, during the interruption of the continuous shooting, that neither a portion nor the whole of the aperture of the lens part is covered.

The present invention makes it possible to determine during the continuous shooting whether at least a portion of the aperture of the lens part is covered.

An electronic camera of the present invention has: a lens part; a covering unit for covering at least a portion of an aperture of the lens part; a determining unit for determining whether at least a portion of the aperture of the lens part is covered with the covering unit; a movie imaging unit for imaging a movie; and an imaging interrupting unit for interrupting the movie imaging of the movie imaging unit when the determining unit determines, during the movie imaging, that at least a portion of the aperture of the lens part is covered.

The present invention makes it possible to determine during the movie imaging whether at least a portion of the aperture of the lens part is covered.

An electronic camera of the present invention has: a lens part; a flash unit for flashing light; a covering unit for covering at least a portion of an aperture of the lens part; a determining unit for determining whether at least a portion of the aperture of the lens part is covered with the covering unit; and a shooting-process interrupting unit for interrupting a shooting processing when the determining unit determines, immediately before a flash emitted from the flash unit, that at least a portion of the aperture of the lens part is covered. In this camera, the flash emission is, for example, a preparative light emission, a main light emission, or an auxiliary light emission for preventing red-eye effect.

The present invention makes it possible to determine, immediately before a flash emitted from the flash unit, whether at least a portion of the aperture of the lens part is covered.

An electronic camera of the present invention has: a lens part being position-changeably mounted on the body of the camera; a position changing unit for changing, in accordance with a change of a position of the lens part, a degree of how much an aperture of the lens part is hidden by the body; a determining unit for determining whether at least a portion of the aperture of the lens part is hidden by the body and hence the lens part is located at an unsuitable position for shooting an image; a release button for setting a shooting condition when half-pressed, and for executing a shooting when full-pressed; a shooting inhibiting unit for inhibiting the shooting when the release button is full-pressed; and the determining unit determines that at least a portion of the aperture of the lens part is located at a position unsuitable for the shooting.

The present invention makes it possible to determine, upon the release button's being full-pressed, whether or not at least a portion of the aperture of the lens part is hidden.

An electronic camera of the present invention has: a lens part position-changeably mounted on the body of the camera; a position changing unit for changing, in accordance with a change of a position of the lens part, a degree of how much an aperture of the lens part is hidden by the body; a determining unit for determining whether at least a portion of the aperture of the lens part is hidden by the body and hence the lens part is located at a position unsuitable for the shooting; a continuous shooting unit for performing continuous shooting; and a continuous shooting interrupting unit for interrupting the continuous shooting of the continuous shooting unit when the determining unit determines, during the continuous shooting, that at least a portion of the aperture of the lens part is located at a position unsuitable for the shooting.

The present invention makes it possible to determine, during continuous shooting, whether at least a portion of the aperture of the lens part is hidden.

Preferably, the continuous shooting interrupting unit of this camera resumes the continuous shooting when the determining unit determines, during the interruption of the continuous shooting, that the aperture of the lens part is not located at any position unsuitable for the shooting.

An electronic camera of the present invention has: a lens part position-changeably mounted on the body of the camera; a position changing unit for changing a degree of how much an aperture is hidden by the body, in accordance with a change of a position of the lens part; a determining unit for determining whether at least a portion of the aperture of the lens part is hidden by the body and hence the lens part is located at a position unsuitable for shooting an image; a movie imaging unit for imaging a movie; and an imaging interrupting unit for interrupting a movie imaging of the movie imaging unit when the determining unit determines, during the movie imaging, that at least a portion of the aperture of the lens part is located at a position unsuitable for the imaging.

The present invention makes it possible to determine, during a movie imaging, whether at least a portion of the aperture of the lens part is hidden.

An electronic camera of the present invention has: a lens part position-changeably mounted on the body of the camera; a flash unit for flashing light; a position changing unit for changing a degree of how much an aperture is hidden by the body, in accordance with a change of a position of the lens part; a determining unit for determining whether at least a portion of the aperture of the lens part is hidden by the body and hence the lens part is located at a position unsuitable for shooting; and a shooting-process interrupting unit for interrupting a shooting processing when the determining unit determines, immediately before a flash emitted from the flash unit, that at least a portion of the aperture of the lens part is located at a position unsuitable for the shooting. In this camera, the flash emission is, for example, a preparative light emission, a main light emission, or an auxiliary light emission for preventing red-eye effect.

The present invention makes it possible to determine, just before a flash emission from the flash unit, whether at least a portion of the aperture of the lens part is hidden.

Further, in order to accomplish the foregoing objects, an electronic camera of the present invention has: a lens part; a covering unit for covering at least a portion of an aperture of the lens part; a determining unit for determining whether at least a portion of the aperture of the lens part is covered with the covering unit; an image pickup unit for imaging a subject with the lens part to produce an image signal; an amplifying unit for amplifying the image signal outputted from the image pickup unit; and a gain control unit for controlling the gain of the amplifying unit based on a determination result from the determining unit. Preferably, the gain control unit of this camera inhibits the control of the gain of the amplifying unit when the determining unit determines that at least a portion of the aperture of the lens part is covered with the covering unit.

The present invention makes it possible to determine whether or not at least a portion of the aperture of the lens part is covered, in order to control the gain of an amplifier that amplifies the image signal.

In order to accomplish the foregoing objects, an electronic camera of the present invention has: a lens part; a covering unit for covering at least a portion of an aperture of the lens part; a determining unit for determining whether at least a portion of the aperture of the lens part is covered with the covering unit; an image pickup unit for imaging a subject with the lens part to produce an image signal; a display unit for displaying an image in accordance with the image signal produced by the image pickup unit; and a display control unit for controlling the image display of the display unit based on the determination result from the determining unit.

Preferably, the display control unit of this camera inhibits the display unit from displaying the image when the determining unit determines that at least a portion of the aperture of the lens part is covered with the covering unit.

More preferably, the display control unit of this camera stops the driving of the image pickup unit when the determining unit determines that at least a portion of the aperture of the lens part is covered with the covering unit.

The present invention makes it possible to determine whether or not at least a portion of the aperture of the lens part is covered, in order to control the image display of the display unit.

In order to accomplish the foregoing objects, an electronic camera of the present invention has: a lens part; a covering unit for covering at least a portion of an aperture of the lens part; a determining unit for determining whether at least a portion of the aperture of the lens part is covered with the covering unit; an inoperative-state detecting unit for measuring a duration of time for which the camera is powered on but not in operation; a power saving unit for setting the operation mode of the camera to a power saving mode in which the power consumption is reduced, when the duration of time measured by the inoperative-state detecting unit is equal to or longer than a predetermined duration of time; and a selecting unit for selecting one of predetermined durations of time according to a determination result from the determining unit, the predetermined durations of time being durations for which the camera is powered on but not in operation, and of which the power saving unit enters into the power saving mode on the basis.

Preferably, when at least a portion of the aperture of the lens part is covered with the covering unit, the selecting unit of this camera sets the predetermined durations of time to smaller values than when the aperture of the lens part is not covered. It is also preferable that the power saving unit of this camera cancels the power saving mode when the determining unit determines that a state of the aperture of the lens part shifts from a covered state to an uncovered state.

The present invention makes it possible to select one of the predetermined durations of time of which the camera enters into the power saving mode on the basis, according to the result of the determination as to whether or not at least a portion of the aperture of the lens part is covered.

In order to accomplish the foregoing objects, an electronic camera of the present invention has: a lens part position-changeably mounted on the body of the camera; a position changing unit for changing a degree of how much an aperture is hidden by the body, in accordance with a change of a position of the lens part; a determining unit for determining whether at least a portion of the aperture of the lens part is hidden by the body and hence the lens part is located at a position unsuitable for shooting; an imaging pickup unit for imaging a subject with the lens part to produce an image signal; an amplifying unit for amplifying an image signal outputted from the image pickup unit; and a gain control unit for controlling the gain of the amplifying unit based on a determination result from the determining unit.

According to the present invention, it is possible to determine whether at least a portion of the aperture of the lens part is hidden, in order to control the gain of an amplifier that amplifies the image signal.

Preferably, the gain control unit of this camera inhibits the control of the gain of the amplifying unit when the determining unit determines that at least a portion of the aperture of the lens part is hidden by the body.

In order to accomplish the foregoing objects, an electronic camera of the present invention has: a lens part position-changeably mounted on the body of the electronic camera; a position changing unit for changing a degree of how much an aperture is hidden by the body, in accordance with a change of a position of the lens part; a determining unit for determining whether at least a portion of the aperture of the lens part is hidden by the body and hence the lens part is located at a position unsuitable for shooting; an image pickup unit for imaging a subject with the lens part to produce an image signal; a display unit for displaying an image in accordance with the image signal produced by the image pickup unit; and a display control unit for controlling the image display of the display unit based on the determination result from the determining unit.

Preferably, the display control unit inhibits the display unit from displaying the image when the determining unit determines that at least a portion of the aperture of the lens part is hidden by the body. Also preferably, the display control unit stops the driving of the image pickup unit when the determining unit determines that at least a portion of the aperture of the lens part is hidden by the body.

The present invention enables the control of the image display of the display unit according to the determination as to whether at least a portion of the aperture of the lens part is covered.

In order to accomplish the foregoing objects, a camera of the present invention has: a lens part position-changeably mounted on the body of the camera; a position changing unit for changing a degree of how much an aperture is hidden by the body, in accordance with a change of a position of the lens part; a determining unit for determining whether at least a portion of the aperture of the lens part is hidden by the body and hence the lens part located at a position unsuitable for shooting an image; an inoperative-state detecting unit for measuring a duration of time for which the camera is powered on but not in operation; a power saving unit for setting the operation mode of the camera to a power saving mode in which the power consumption is reduced, when the duration of time measured by the inoperative-state detecting unit is equal to or longer than a predetermined duration of time; and a selecting unit for selecting one of predetermined durations of time according to the determination result from the determining unit, the predetermined durations of time being durations for which the camera is powered on but not in operation, and of which the power saving unit enters into the power saving mode on the basis.

The present invention makes it possible to select the predetermined duration of time of which the camera enters into the power saving mode on the basis, according to the result of the determination as to whether or not at least a portion of the aperture of the lens part is hidden.

Preferably, when at least a portion of the aperture of the lens part is hidden by the body, the selecting unit sets the predetermined durations of time to smaller values than when the aperture of the lens part is not hidden by the body. Also preferably, the power saving unit cancels the power saving mode when the determining unit determines a state of the aperture shifts from a covered state to an uncovered state.

BRIEF DESCRIPTION OF THE DRAWINGS

FIG. 6 show that switches SW1 and SW2 are turned on/off by a cam directly coupled to a rotational axis, in accordance with rotational positions of the image pickup block.

FIG. 7 show that the switches SW1 and SW2 are turned on/off by the cam directly coupled to the rotational axis, in accordance with rotational positions of the image pickup block.

FIG. 8 is a diagram showing that the camera determines whether shooting is feasible or not in accordance with the on/off states of the switches SW1 and SW2.

FIG. 9 is a flowchart for explaining an operation in the block diagram of FIG. 5.

DESCRIPTION OF THE PREFERRED EMBODIMENTS

Embodiments of the present invention will be described below.

Figure 1:
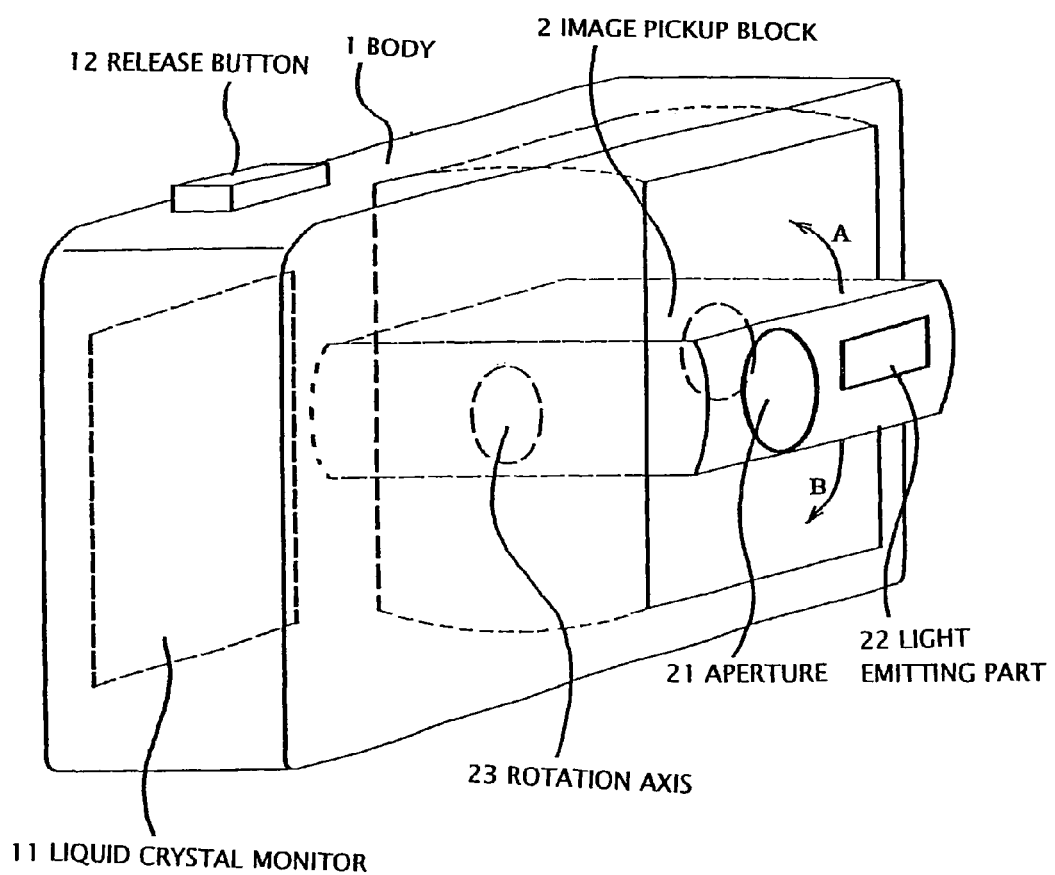
FIG. 1 is a perspective diagram of a camera used in an embodiment of the present invention.

FIG. 1 is a perspective diagram of a camera used in an embodiment of the present invention.

In FIG. 1, illustrated are a camera body 1, an image pickup block 2, an aperture 21 of a lens part, a light emitting part 22 of a flash part, and a rotation axis 23 of the image pickup block 2. The image pickup block 2 has, the lens part (not shown), a CCD (not shown) serving as an image pickup device, and the light emitting part 22 of the flash part. The body 1 has a liquid crystal monitor 11 and a release button 12.

In the embodiment of FIG. 1, the image pickup block 2 can be rotated on its rotation axis 23 in directions as indicated by arrows A and B. As apparent from FIG. 1, the image pickup block 2 is rotatable within the body 1. This body 1 corresponds to "covering unit" recited in the Claims, and the rotation of the image pickup block 2 corresponds to the position changing of "position changing unit" recited therein.

Figure 2:
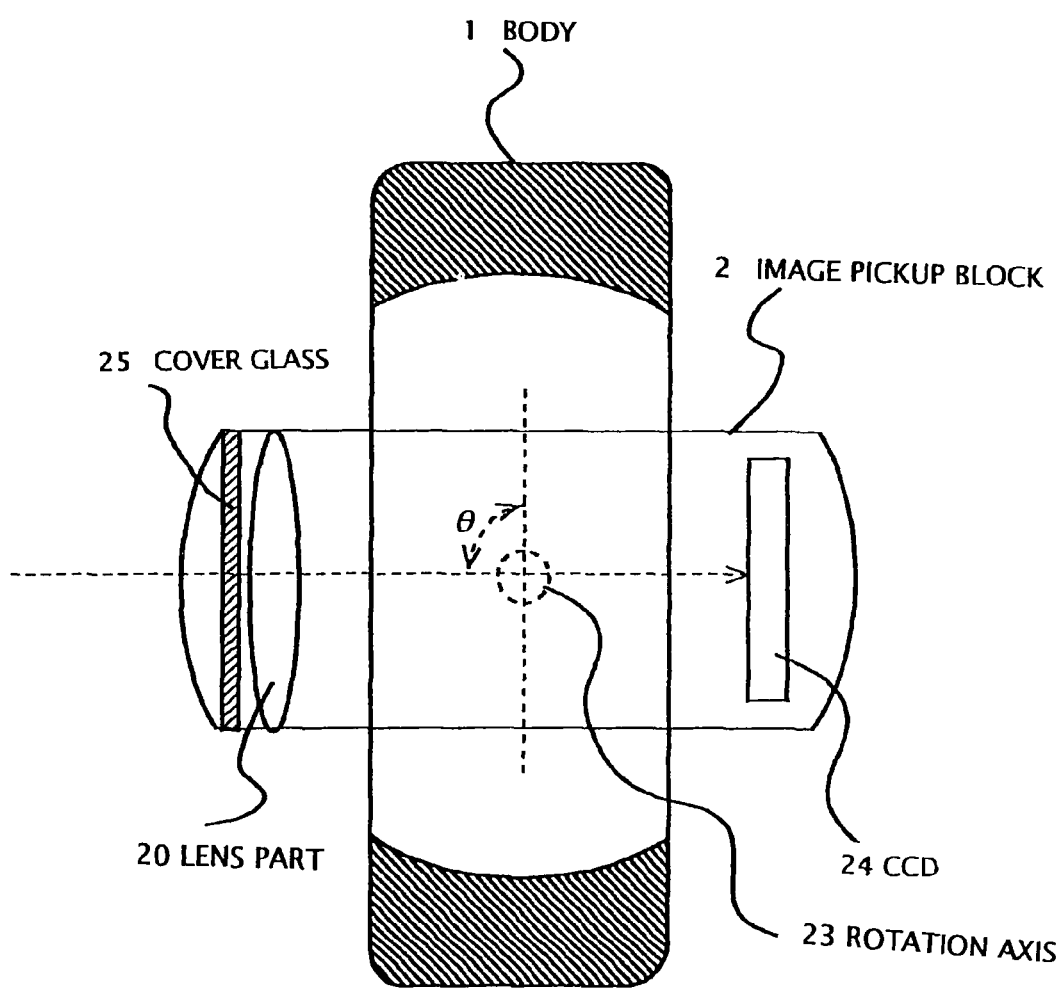
FIG. 2 shows an image pickup block with its position rotationally changing relative to the body of the camera.
Figure 3:
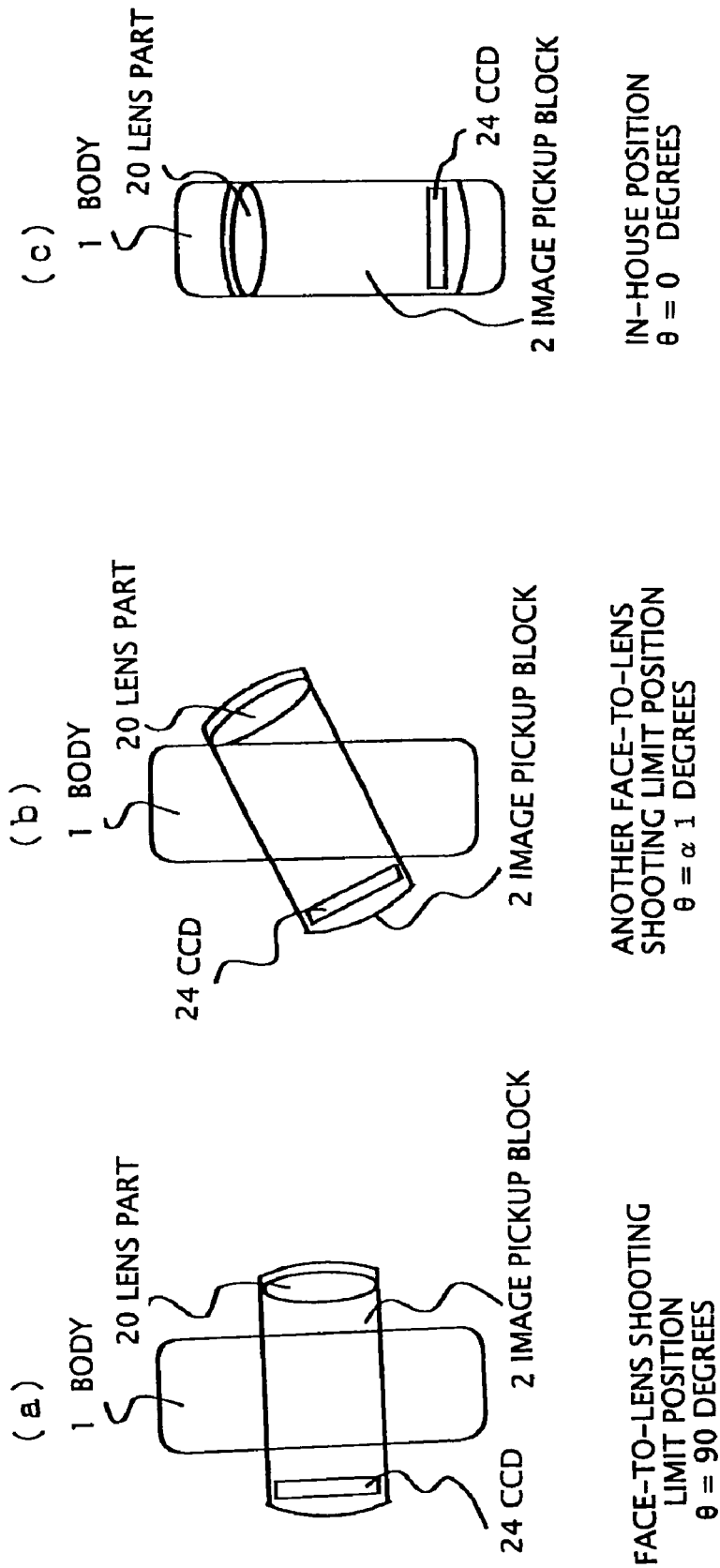
FIG. 3 show an image pickup block with its position rotationally changing relative to the body of the camera.
Figure 4:
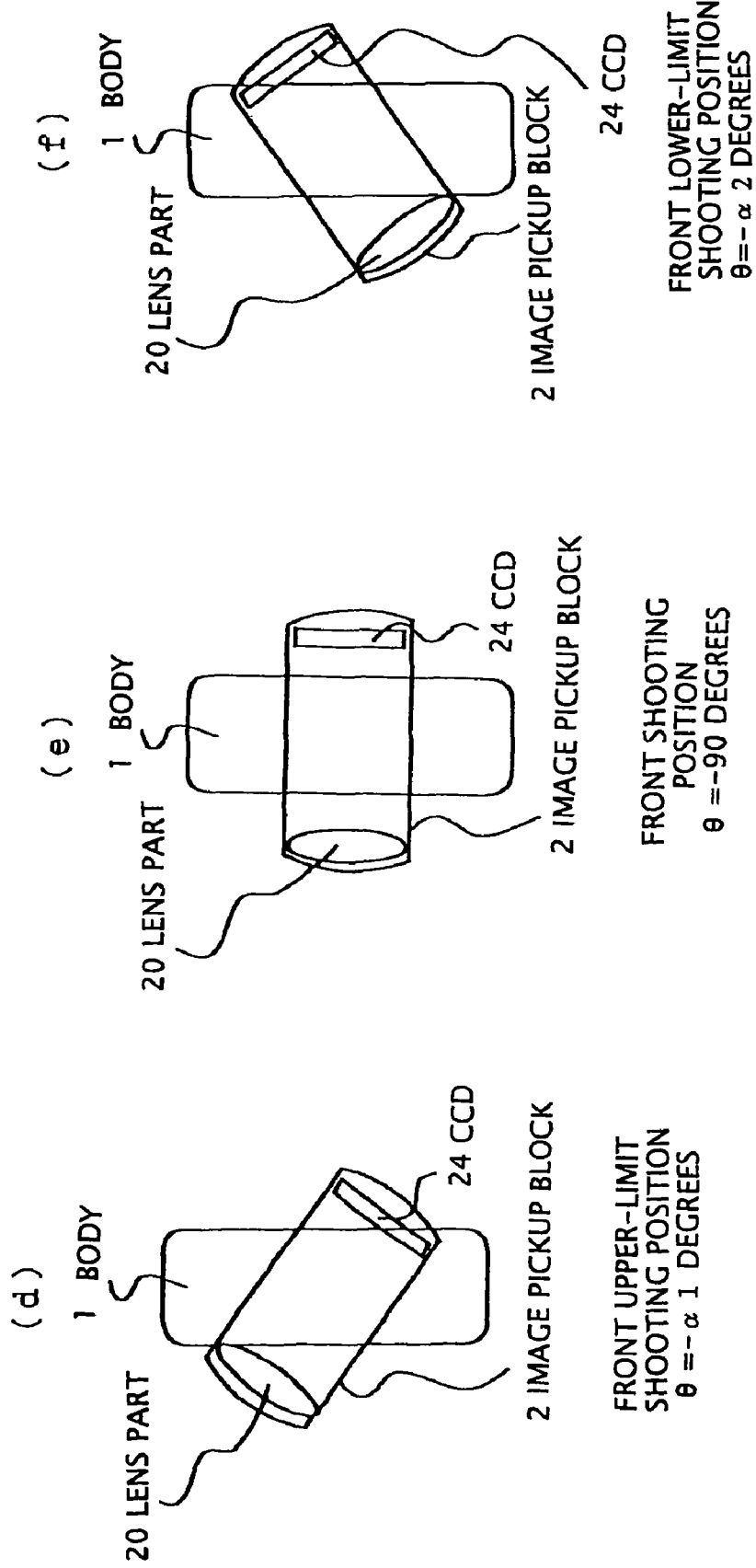
FIG. 4 show an image pickup block with its position rotationally changing relative to the body of the camera.

FIGS. 2, 3 and 4 are diagrams showing the image pickup block 2 with its position rotationally changing relative to the body 1.

FIG. 2 shows the image pickup block 2 with rotated to a position at angle θ (θ is a variable) on its rotation axis 23. FIG. 2 shows that the image pickup block 2 is positioned at the angel θ of minus 90 degrees.

FIGS. 3-(a), 3-(b), 3-(c), 4-(d), 4-(e) and 4-(f) each show position to which the image pickup block 2 has rotated.

FIG. 3-(a) shows the rotated image pickup block 2 in a position at the angle θ of 90 degrees. In the present embodiment, the angle θ of 90 degrees is a "face-to-lens shooting" limit position. That is, the present embodiment is configured that the rotational angle θ not be greater than 90 degrees. The term "face-to-lens shooting" used herein means that the lens part 20 of the image pickup block 2 faces to a user at the shooting (taking a picture of the user himself or herself.

FIG. 3-(b) shows the rotated image pickup block 20 in a position at the angle θ of α1. In the present embodiment, at the angle θ being less than α1, the aperture of the lens part 2 begins to be hidden by the body 1, which causes a vignetting. FIG. 3-(b), therefore, shows another face-to-lens shooting limit position.

FIG. 3-(c) shows the image pickup block 2 in a position at angle θ of zero degrees. In this state, the image pickup block 2 is housed in the body 1. Therefore, shooting is not feasible.

FIG. 4-(d) shows the rotated image pickup block 20 in a position at angle θ of minus α1. In the present embodiment, at the angle θ being less than minus α1, the aperture of the lens part 2 is no longer hidden by the body 1, which means no vignetting occurs. FIG. 4-(d), therefore, shows a front upper-limit shooting position.

FIG. 4-(e) shows the rotated image pickup block 20 in a position at angle θ of minus 90 degrees. This is a front shooting position of a conventional camera. The term "front shooting" signifies that the lens part 20 of the image pickup block 2 faces to a subject at the shooting (a conventional shooting).

FIG. 4-(f) shows the rotated image pickup block 2 in a position at angle θ of minus a2. In the present embodiment, at the angle θ less than minus a2, the aperture of the lens part 2 will begin to be hidden by the body 1, which may cause a vignetting. This embodiment is configured, therefore, that the angle θ not be less than minus α2. Thus, FIG. 4-(f) showing is a front lower-limit shooting position of the electronic camera.

The electronic camera of the present embodiment is so constructed as to allow the camera operator to recognize rotational position changing of the lens part 20 with clicking feeling while it rotates from the position of FIG. 3-(a) to the position of FIG. 4-(f).

Figure 5:
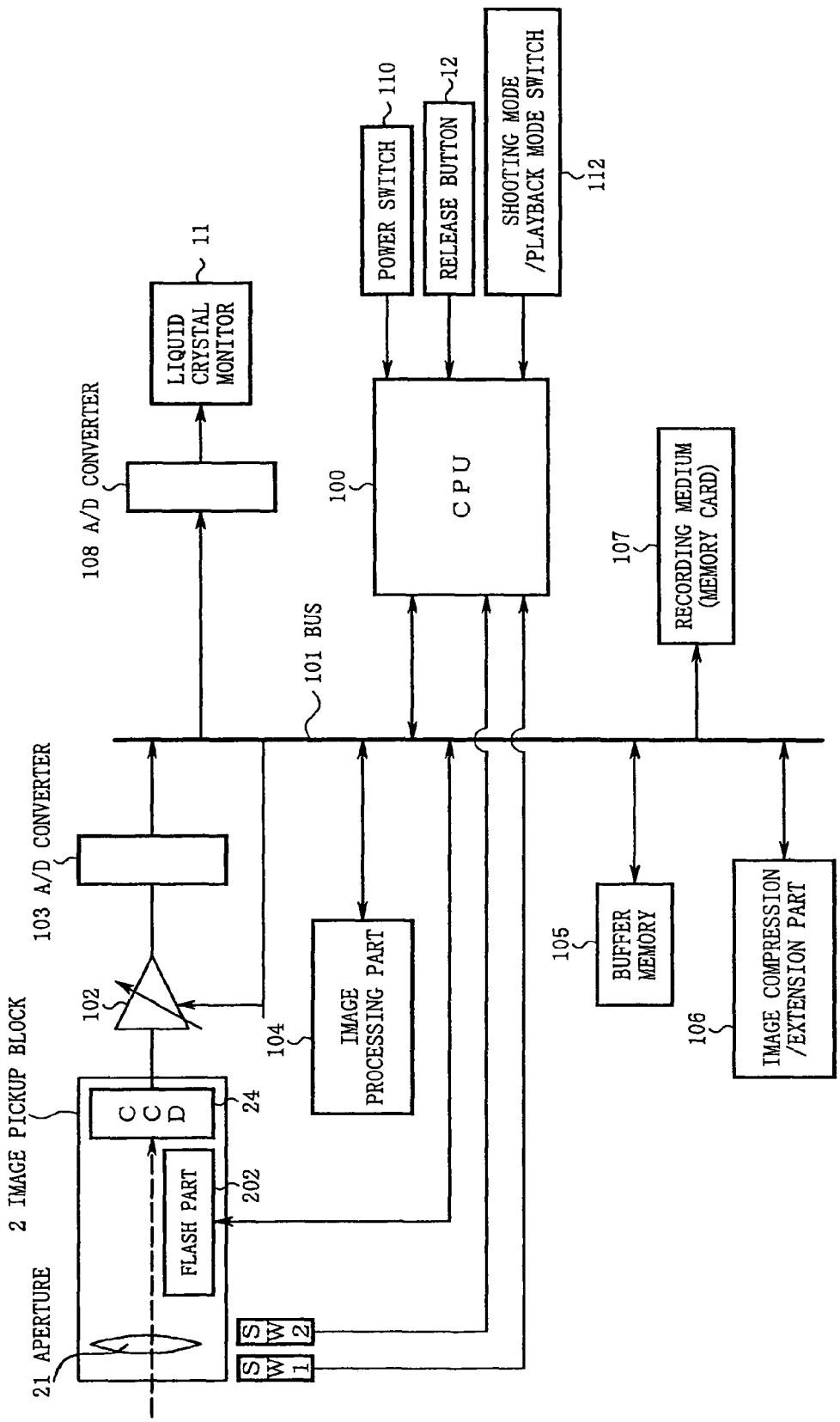
FIG. 5 is a block diagram of the camera.

FIG. 5 is a block diagram of the electronic camera in the present embodiment. In FIG. 5, depicted are a CPU 100, a bus 101, a gain adjustable amplifier 102, an A/D converter 103, an image processing part 104, a buffer memory 105, an image compression/extension part 106, a recording medium 107, a D/A converter 108, the liquid crystal monitor 11, a power switch 110, the release button 12, an imaging mode/playback mode switch 112, and switches SW1 and SW2. The image pickup block 2 includes a flash part 202. The image pickup block 2 also includes AF and AE mechanisms, which are well known and hence not shown in the figure.

The switches SW1 and SW2, fixed to the body 1, are used to determine whether at least a portion of the aperture of the lens part 20 is hidden by the body 1 and hence the lens part 20 is located at a position unsuitable for shooting. The switches SW1 and SW2 constitute, together with a cam (which will be described later) provided to the rotation axis 23, a part of "determining unit" recited in the claims.

Operations of the electronic camera shown in FIG. 5 will be described below.

In FIG. 5, when the power switch 110 is turned on, the electronic camera starts its operation. In the following description, it is assumed that the imaging mode/playback mode switch 112 has been set to an imaging mode. The operation in the playback mode is not relevant to the present invention, and hence its description is omitted.

Firstly, an ordinal picture taking will now be described.

When the release button 12 is half-pressed, the AE and AF processings are executed, and it is decided whether a flash will be emitted.

When the release button 12 is full-pressed, a subject image focused on a CCD 24 of the image pickup block 2 is converted, by the CCD 24, into an analog image signal, which is then inputted to the amplifier 102.

The amplifier 102 amplifies the inputted analog image signal by a gain established by the CPU 100. The analog image signal outputted from the amplifier 102 is inputted to the A/D converter 103 and then converted thereby into a digital image signal.

The digital image signal outputted from the A/D converter 103 is inputted to the image processing part 104 and subjected thereby to image processings, such as white balance, gamma conversion, pixel interpolation and so on. These image processings are not directly relevant to the present invention and hence their descriptions are omitted.

The image-processed digital image data is temporarily stored in the buffer memory 105.

The digital image signal outputted from the buffer memory 105 is image compressed by the image compression/extension part 106 and thereafter stored in the recording medium 107, such as a memory card or the like.

On the other hand, the digital image signal outputted from the A/D converter 103 is also inputted to the D/A converter 108 and converted thereby to an analog image signal, which is outputted to the liquid crystal monitor 11.

The liquid crystal monitor 11 displays the image currently captured by the CCD 24 as it is. This displayed image will be referred to as "through image" hereinafter.

The flash part 202 provides flash emissions (preparative and main light emissions) in response to commands from the CPU 100.

Next, the operation of the switches SW1 and SW2 will now be described with reference to FIGS. 6 and 7. As previously stated, the switches SW1 and SW2 are provided for determining whether at least a portion of the aperture of the lens part 20 is hidden by the body 1 and hence located at a position unsuitable for shooting.

FIGS. 6 and 7 illustrate the operations of the switches SW1 and SW2 from that the switches SW1 and SW2 are turned on/off by a cam 26 directly coupled to the rotation axis 23, to that they decide whether the position of the image pickup block 2 is unsuitable for shooting. The operations of the switches SW1 and SW2 accord with a rotational position of the image pickup block 2 (See the angles θ of FIGS. 3 and 4). More specifically, the CPU 100 (See FIG. 5) determines whether the image pickup block 2 is oriented at a position unsuitable for shooting by monitoring the on/off states of the switches SW1 and SW2. The switches SW1 and SW2, cam 26 and CPU 100 correspond to the "determining unit" recited in the claims.

As shown in FIG. 6-(a), the switches SW1 and SW2 both are in off-state at the face-to-lens shooting position (θ=90 degrees) because a protrusion part of the cam 26 is not engaged with the switches SW1 and SW2. At this moment, the CPU 100 (See FIG. 5) determines that the shooting is feasible.

As shown in FIG. 6-(b), at the face-to-lens shooting limit position (θ=α1), the switch SW1 remains in the off-state, but the switch SW2 begins to engage with the protrusion part of the cam 26 and hence shift from the off-state to the on-state. Therefore, when the image pickup block 2 exceeds the face-to-lens shooting limit position, the CPU 100 (See FIG. 5) determines that the shooting is unfeasible. In such a case, even with the release button 12 full-pressed, the CPU 100 will not respond to that.

As shown in FIG. 6-(c), at the in-house position (θ=zero degrees), the switches SW1 and SW2 are in the off-state and the on-state, respectively, and hence the CPU 100 (See FIG. 5) determines that the shooting is unfeasible. In such a case, even with the release button 12 full-pressed, the CPU 100 will not respond to it.

As shown in FIG. 7-(d), at the front upper-limit shooting position (θ=minus α1), the switch SW2 remains in the on-state, and the switch SW1 begins to engage with the protrusion part of the cam 26 and hence shifts from the off-state to the on-state. Therefore, when the image pickup block 2 exceeds the front upper-limit shooting position, the CPU 100 (See FIG. 5) determines that the shooting is feasible.

As shown in FIG. 7-(e), at the front lower-limit shooting position (θ=minus α2), the switches SW1 and SW2 both remain in the on-states, and hence the CPU 100 (See FIG. 5) determines that the shooting is feasible.

As apparent from the above descriptions, the CPU 100 shown in FIG. 5 determines whether the shooting is feasible or unfeasible, according to a table shown in FIG. 8.

When the CPU 100 determines that the shooting is unfeasible, it inhibits any shooting processing even if the release button 12 is full-pressed. The CPU 100 also controls, based on its determination result, the gain of the amplifier 102 and the display of "through image" on the liquid crystal monitor 11, while adjusting the time after which the power saving mode is entered.

FIG. 9 is a flowchart for explaining an operation in the embodiment shown in FIG. 5. This flowchart shows the operation in the continuous shooting mode.

At the start of the continuous shooting mode, the CPU 100 determines whether the release button 12 has been full-pressed, at a step S10. If the release button 12 has been full-pressed, the CPU 100 proceeds to a step S11. Otherwise, the CPU 100 repetitively executes the determination of the step S10, while initiating no continuous shooting.

In the step S11, the CPU 100 provides AF and AE processings as pre-processings of the continuous shooting.

Next, in a step S12, the CPU 100 determines whether the image pickup block 2 is oriented at a shooting-possible position. If yes, the CPU 100 proceeds to a step S13. If no, the CPU 100 goes back to the step S10.

In the step S13, the CPU 100 executes a continuous shooting.

In a step S14, the CPU 100 determines whether the release button 12 has been being full-pressed. If yes, the CPU 100 proceeds to a step S15. If no, the CPU 100 goes back to the step S10.

In the step S15, CPU 100 determines whether the image pickup block 2 is oriented at a shooting-possible position. If yes, the CPU 100 returns to the step S13 and maintains the continuous shooting. If no, the CPU 100 returns to the step S14 and interrupts the continuous shooting until the image pickup block 2 becomes oriented at a shooting-possible position.

According to the flowchart of FIG. 9, when the image pickup block 2 is rotated, during a continuous shooting, to a position in which the shooting is not possible, the continuous shooting can be interrupted. Thereafter, when the image pickup block 2 is rotated back to a shooting-possible position, the continuous shooting can be resumed. This enables prevention of inappropriate image capturing during the continuous shooting.

Figure 10:
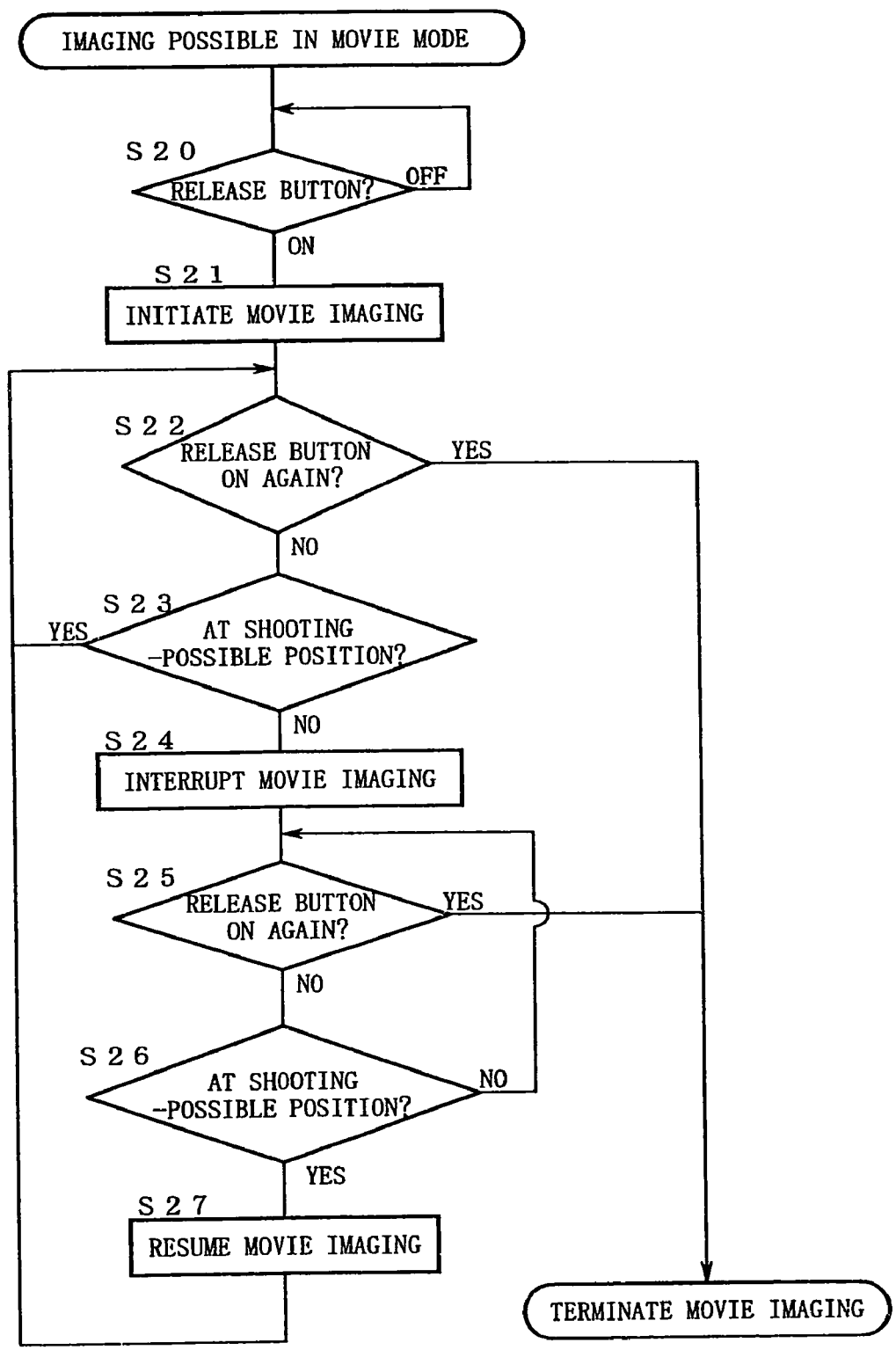
FIG. 10 is a flowchart for explaining an operation in the block diagram of FIG. 5.

FIG. 10 is a flowchart for explaining an operation in the embodiment shown in FIG. 5. This flowchart shows the operation in a movie imaging mode.

At the initiation of the movie imaging mode, the CPU 100 determines whether the release button 12 has been full-pressed, at a step S20. If the release button 12 has been full-pressed, the CPU 100 proceeds to a step S21. Otherwise, the CPU 100 repetitively executes the determination of the step S20, while initiating no movie imaging.

In the step S21, the CPU 100 initiates a movie imaging.

Next, in a step S22, the CPU 100 determines whether the release button 12 has been full-pressed again after the step S20. If no, the CPU 100 proceeds to a step S23. If yes, the CPU 100 terminates the movie imaging.

In the step S23, the CPU 100 determines whether the image pickup block 2 is oriented at a shooting-possible position. If yes, the CPU 100 goes back to the step S22, and maintains the movie imaging. If no, the CPU 100 proceeds to a step S24.

In the step S24, the CPU 100 interrupts the movie imaging.

Next, in a step S25, the CPU 100 determines whether the release button 12 has been full-pressed again. If no, the CPU 100 proceeds to a step S26. If yes, the CPU 100 terminates the movie imaging.

In the step S26, the CPU 100 determines whether the image pickup block 2 is oriented at a shooting-possible position. If yes, the CPU 100 proceeds to a step S27. If no, the CPU 100 goes back to the step S24.

In the step S27, the CPU 100 resumes the movie imaging, and goes back to the step S22.

According to the flowchart of FIG. 10, when the image pickup block 2 is rotated, during a movie imaging, to a shooting-impossible position, the movie imaging can be interrupted. Thereafter, when the image pickup block 2 is rotated back to a shooting-possible position, the interrupted movie imaging can be resumed. In this way, an inappropriate movie can be prevented from being imaged during the movie imaging.

Figure 11:
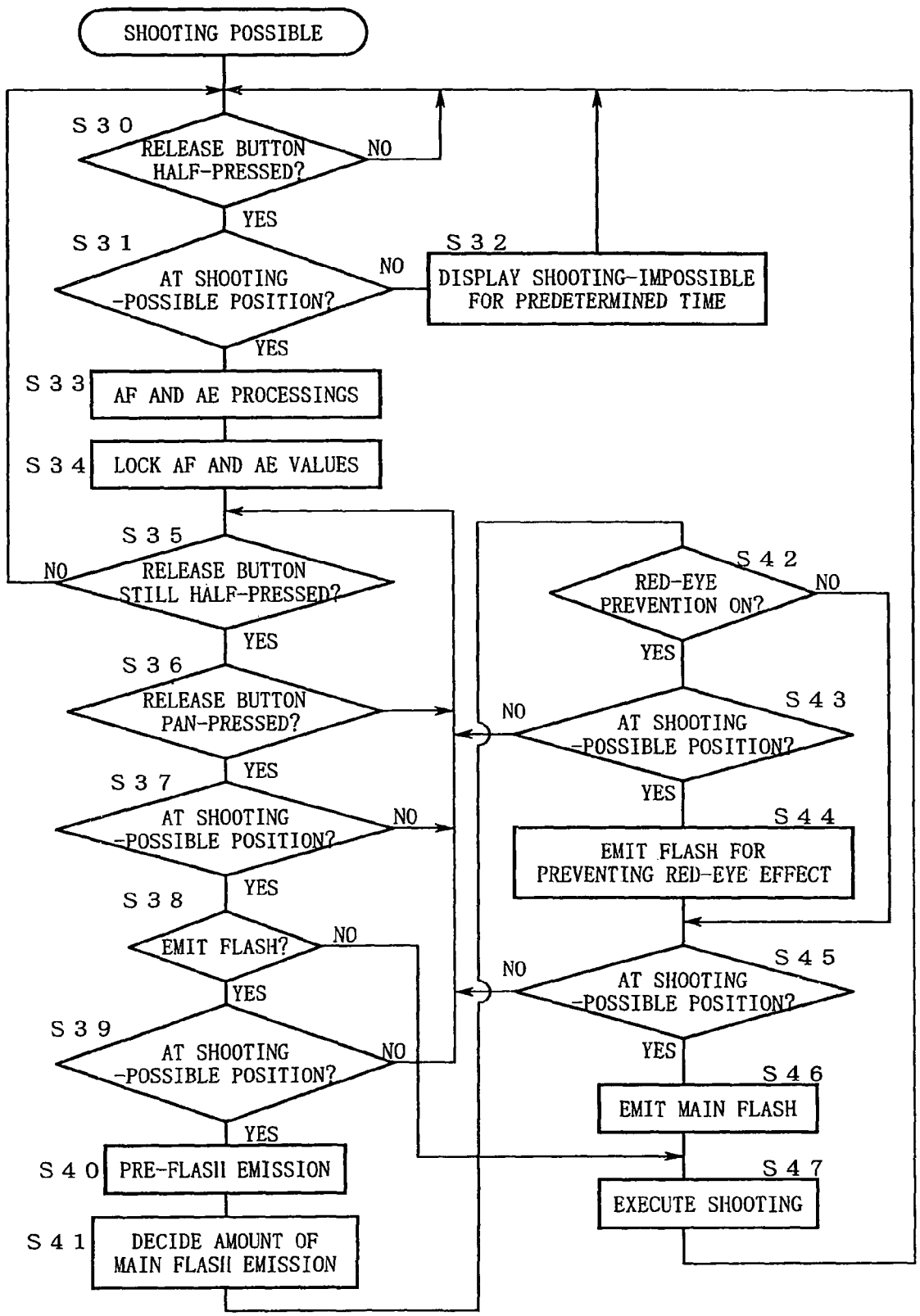
FIG. 11 is a flowchart for explaining an operation in the block diagram of FIG. 5.

FIG. 11 is a flowchart for explaining an operation in the embodiment shown in FIG. 5. This flowchart describes the operation of determining whether the image pickup block 2 is oriented at a shooting-possible position before a light emission of the flash part.

In a step S30, the CPU 100 determines whether the release button 12 has been half-pressed. If no, the CPU 100 repetitively executes the determination of the step S30. If yes, the CPU 100 proceeds to a step S31.

In the step S31, the CPU 100 determines whether the image pickup block 2 is oriented at a shooting-possible position. If yes, the CPU 100 proceeds to a step S33. If no, the CPU 100 proceeds to a step S32.

In the step S32, the CPU 100 displays an indication informing that shooting is not feasible on the liquid crystal monitor 11 for a predetermined period of time, and then goes back to the step S30.

In the step S33, the CPU 100 provides AF and AE processings.

Next, in a step S34, the CPU 100 locks the AF and AE values obtained in the preceding step S33.

In a step S35, the CPU 100 determines whether the release button 12 has been being half-pressed. If no, the CPU 100 goes back to the step S30. If yes, the CPU 100 proceeds to a step S36.

In the step S36, the CPU 100 determines whether the release button 12 has been full-pressed. If no, the CPU 100 goes back to the step S35. If yes, the CPU 100 proceeds to a step S37.

In the step S37, the CPU 100 determines whether the image pickup block 2 is oriented at a shooting-possible position. If yes, the CPU 100 proceeds to a step S38. If no, the CPU 100 goes back to the step S35.

In the step S38, the CPU 100 determines whether a presently set mode is a mode for allowing flash part 202 to flash light. If no, the CPU 100 proceeds to a step S47. If yes, the CPU 100 proceeds to a step S39.

In the step S39, the CPU 100 determines whether the image pickup block 2 is oriented at a shooting-possible position. If yes, the CPU 100 proceeds to a step S40. If no, the CPU 100 goes back to the step S35.

In the step S40, the CPU 100 causes the flash part 202 to emit a pre-flash (preparative light emission).

In a step S41, the CPU 100 decides the amount of a main light emission from the pre-flash emission (preparative light emission).

In a step S42, the CPU 100 determines whether a presently set mode is a mode for allowing the flash part 202 to emit a flash for preventing red-eye effect. If no, the CPU 100 proceeds to a step S45. If yes, the CPU 100 proceeds to a step S43.

In the step S43, the CPU 100 determines whether the image pickup block 2 is oriented at a shooting-possible position. If yes, the CPU 100 proceeds to a step S44. If no, the CPU 100 goes back to the step S35.

In the step S44, the CPU 100 allows the flash part 202 to emit a flash for preventing red-eye effect.

In the step S45, the CPU 100 determines whether the image pickup block 2 is oriented at a shooting-possible position. If yes, the CPU 100 proceeds to a step S46. If no, the CPU 100 goes back to the step S35.

In the step S46, the CPU 100 allows the flash part 202 to emit a main light.

In the step S47, the CPU 100 executes shooting, and returns to the step S30.

It is able to inhibit the flash emission according to the flowchart of FIG. 11, when the image pickup block 2 is rotated to a shooting-impossible position before a flash emission (a preparative light emission, a light emission for preventing red-eye effect, or a main light emission). This can prevent the occurrences of problems that a structure between the camera case and the flash part otherwise would be deformed due to the heat and that the heat otherwise would cause the shortening of the life of the electronic camera, and the like.

Figure 12:
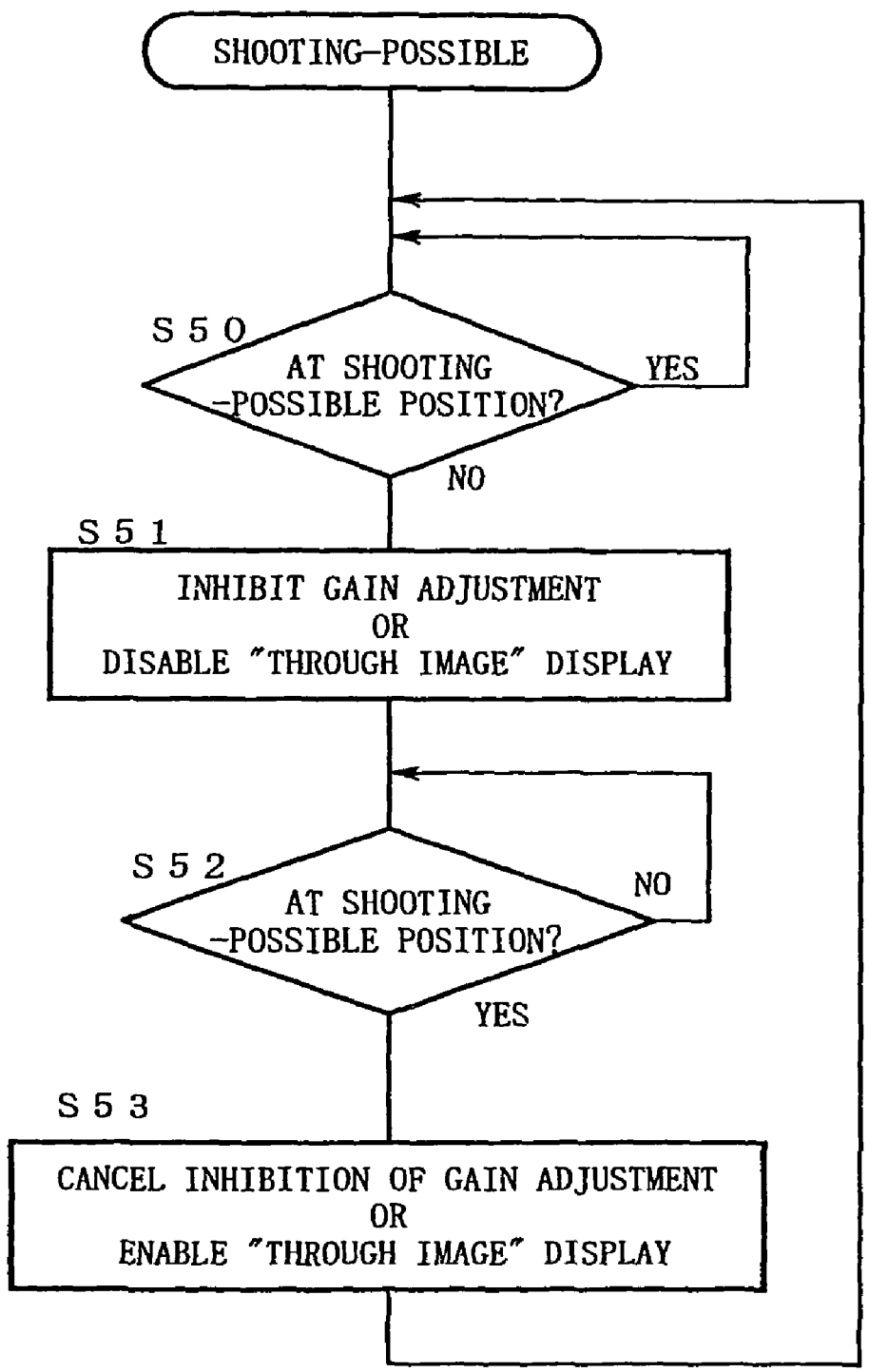
FIG. 12 is a flowchart for explaining an operation in the block diagram of FIG. 5.

FIG. 12 is a flowchart for explaining an operation in the embodiment shown in FIG. 5. This flowchart describes the operations of controlling the gain of the amplifier 102 and of controlling the display of "through image".

In the flowchart of FIG. 12, it is assumed that the electronic camera is to be in a shooting-possible state.

In a step S50, according to the table of FIG. 8, the CPU 100 determines, based on the on/off states of the switches SW1 and SW2, whether the image pickup block 2 is oriented at a shooting-possible position. If yes, the CPU 100 repetitively executes the step S50. If no, the CPU 100 proceeds to a step S51.

In the step S51, the CPU 100 inhibits the control of the gain of the amplifier 102 shown in FIG. 5. Also in the step S51, the CPU 100 inhibits the display of "through image" on the liquid crystal monitor 11, and disables the liquid crystal monitor 11.

Next, in a step S52, according to the table of FIG. 8, the CPU 100 again determines, according to the on/off states of the switches SW1 and SW2, whether the image pickup block 2 is oriented at a shooting-possible position. If no, the CPU 100 repetitively executes the step S52. If yes, the CPU 100 proceeds to a step S53.

In the step S53, the CPU 100 cancels the inhibition of the control of the gain of the amplifier 102 shown in FIG. 5. Also in the step S53, the CPU 100 cancels the inhibition of the display of "through image" on the liquid crystal monitor 11, and enables the liquid crystal monitor 11.

As apparent from the above, operating according to the flowchart of FIG. 12 can prevents automatic increases in the sensitivity of the image pickup part in a case where the image pickup block 2 is oriented at a shooting-impossible position. Thereafter, when the image pickup block 2 is rotated to a shooting-possible position, it is able to resume the automatic adjustment of the sensitivity of the image pickup part.

Moreover, operating according to the flowchart of FIG. 12 can prevent improper images with noise from being displayed on the liquid crystal monitor 11 when the image pickup block 2 is oriented at a shooting-impossible position. Thereafter, when the image pickup block 2 is rotated back to a shooting-possible position, it is able to resume the display of "through image" on the liquid crystal monitor 11.

According to the flowchart of FIG. 12 the gain and display controls are described. The present invention, however, is not limited thereto. It may be configured that, for example, the CCD 24 serving as an image pickup device may be disabled when the image pickup block 2 is oriented at a shooting-impossible position. Thereafter, the image pickup block 2's rotating back to a shooting-possible position, the CCD 24 may be enabled again.

Figure 13:
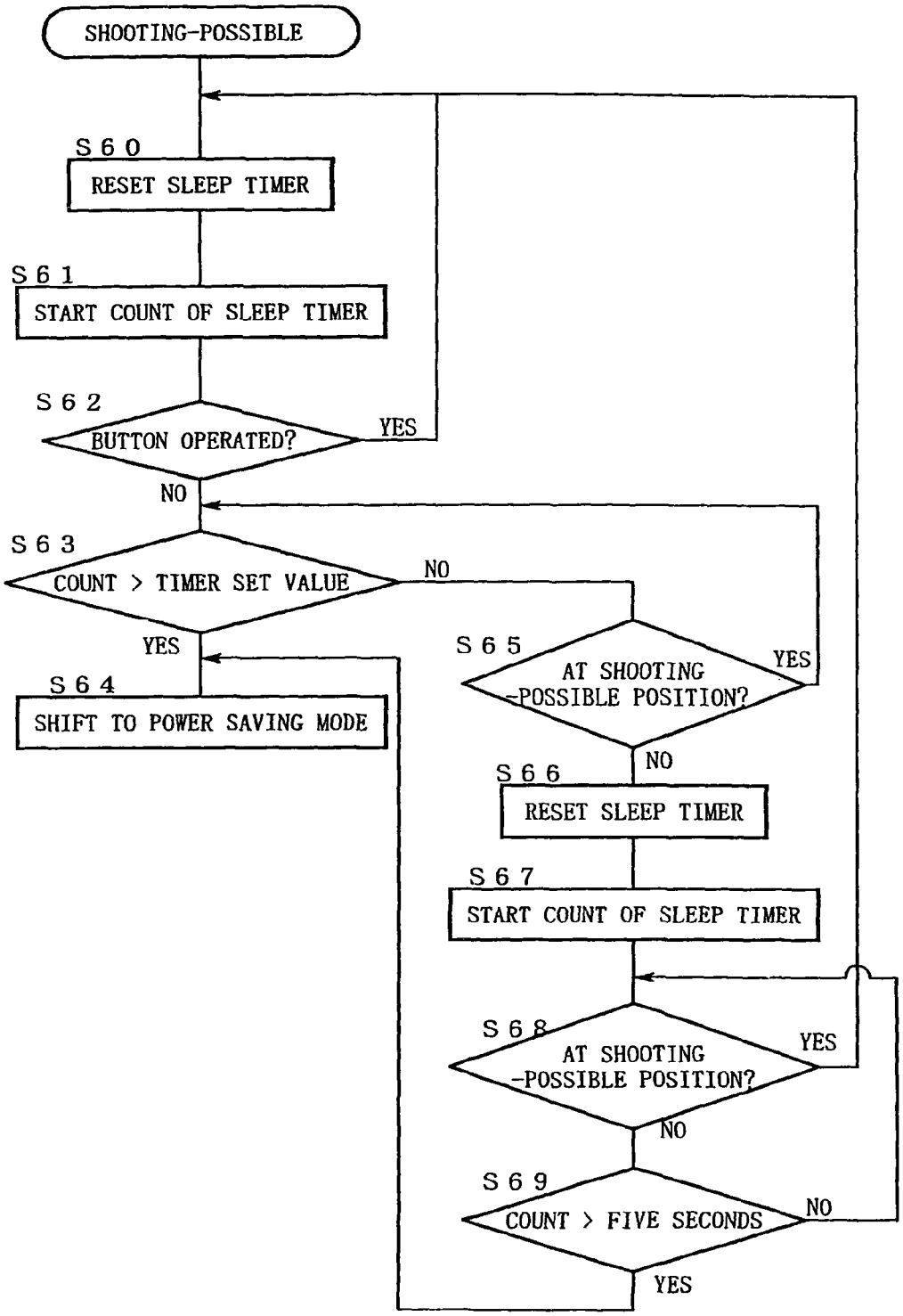
FIG. 13 is a flowchart for explaining an operation in the block diagram of FIG. 5.

FIG. 13 is a flowchart for explaining an operation in the embodiment shown in FIG. 5. This flowchart explains the operation in which the camera executes a power saving mode.

In the flowchart of FIG. 13, it is assumed that the camera is to be shooting-possible.

In a step S60, the CPU 100 sets a sleep timer. This sleep timer may be a timer included in, for example, the CPU 100. Time can be set on the sleep timer at a desired time using a menu for display on the liquid crystal monitor 11 or the like. In the present embodiment, it is assumed that in the step S60, the time of the sleep timer is set at thirty seconds.

In a step S61, the CPU 100 starts the count of the sleep timer.

In a step S62, the CPU 100 determines whether any button has been operated. If yes, the CPU 100 goes back to the step S60 and repeats the foregoing operations. If no, the CPU 100 proceeds to a step S63.

In the step S63, the CPU 100 determines whether the count of the sleep timer exceeds the value set in the step S60. If yes, the CPU 100 proceeds to a step S64, and enters into a power saving mode. If no, the CPU 100 proceeds to a step S65.

In the step S65, according to the table of FIG. 8, the CPU 100 determines, according to the on/off states of the switches SW1 and SW2, whether the image pickup block 2 is oriented at a shooting-possible position. If yes, the CPU 100 repetitively executes the step S63. If no, the CPU 100 proceeds to a step S66.

In the step S66, the CPU 100 sets the sleep timer at a time shorter than the value set in the step S60. In the present embodiment, it is assumed that in the step S66, the time of the sleep timer is to be set at five seconds.

In a step S67, the CPU 100 starts the count of the sleep timer.

In a step S68, the CPU 100 again determines whether the image pickup block 2 is oriented at a shooting-possible position. If yes, the CPU 100 goes back to the step S60. If no, the CPU 100 proceeds to a step S69.

In the step S69, the CPU 100 determines whether the count of the sleep timer exceeds the five seconds. If no, the CPU 100 repeats the determination of the step S69. If yes, the CPU 100 proceeds to the step S64, and enters a power saving mode.

It should be noted that the operations of "inoperative-state detecting unit" recited in the claims correspond to the processings in the steps S60 through S62 described above; the operations of "power saving unit" recited in the claims correspond to the processings in the steps S63, S64 and S69; and the operations of "selecting unit" recited in the claims correspond to the processings in the steps S63 through S67.

It also should be noted that a camera capturing images on a silver film enters a power saving mode through similar procedures to those shown in the flowchart of FIG. 13.

As apparent from the above, when the image pickup block 2 is not oriented at any shooting-possible position, the operations according to the flowchart of FIG. 13 allow the camera to enter into the power saving mode earlier than in usual operations, which is advantageous in eliminating unnecessary power consumption.

Figure 14:
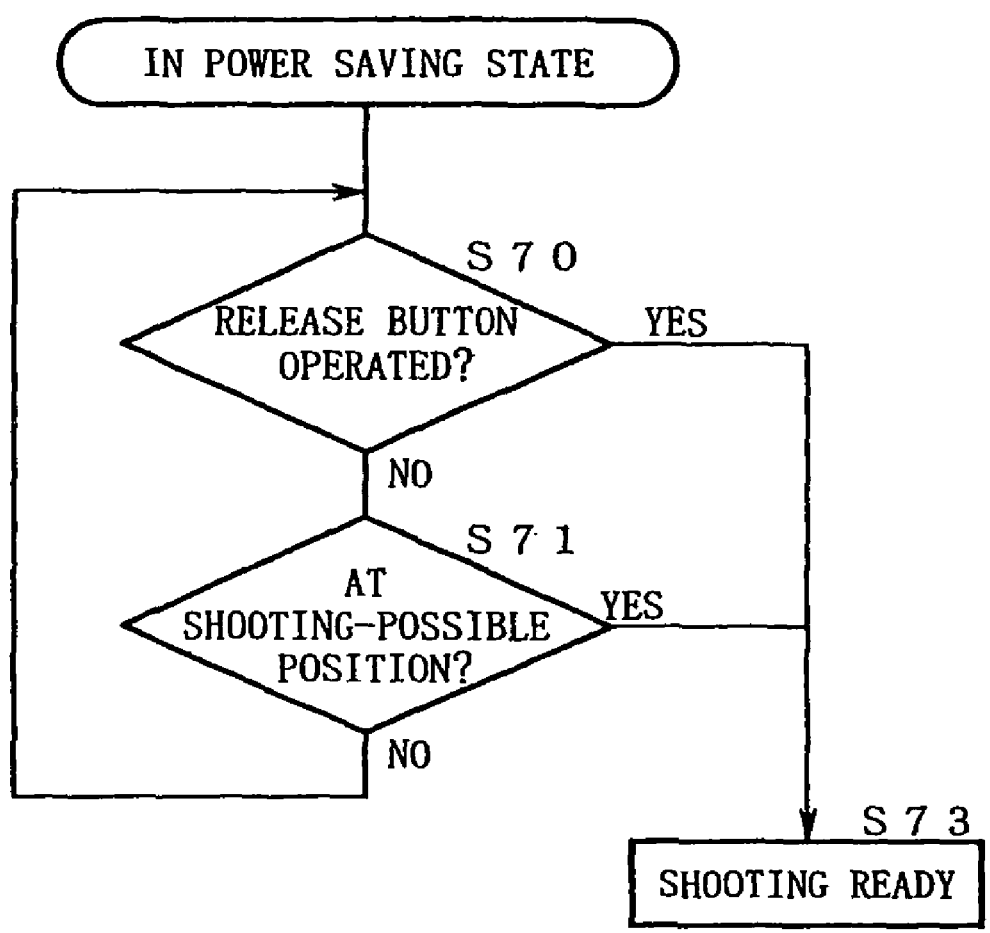
FIG. 14 is a flowchart for explaining an operation in the block diagram of FIG. 5.

FIG. 14 is a flowchart for explaining an operation in the embodiment shown in FIG. 5. This flowchart shows the operation in which the camera recovers from a power saving mode.

In a step S70, the CPU 100 determines whether the release button 12 has been operated. If yes, the CPU 100 proceeds to a step S73, and causes the camera to shift from a sleep state to a shooting state. If no, the CPU 100 proceeds to a step S71.

In the step S71, according to the table of FIG. 8, the CPU 100 determines, based on the on/off states of the switches SW1 and SW2, whether the image pickup block 2 is oriented at a shooting-possible position. If yes, the CPU 100 proceeds to the step S73 and causes the camera to shift from a sleep state to a shooting state. If no, the CPU 100 goes back to the step S70.

As apparent from the above, operating according to the flowchart of FIG. 14 enable the camera to shift from the power saving mode to the imaging mode when the image pickup block 2 returns to a shooting-possible position.

It should be noted that a camera capturing images on a silver film recovers from a power saving mode according to similar procedures to those shown in the flowchart of FIG. 14.

The invention is not limited to the above embodiments and various modifications may be made without departing from the spirit and scope of the invention. Any improvement may be made in part or all of the components.

What is claimed is:

1. An electronic camera which has an imaging mode, and a non-imaging mode, respectively, the electronic camera comprising:
    a lens part being position-changeably mounted on a body of the electronic camera;
    a changing position unit changing the lens part between a storage position and a shooting-possible position in accordance with a degree of rotational position changing of the lens part, the storage position being a position where an aperture of the lens part is completely covered with the body of the electronic camera and where an almost continuous flat outermost surface is formed by the lens part and the body of the electronic camera, and the shooting-possible position being a position where the aperture of the lens part is not covered with the body of the electronic camera and sticks out from the body of the electronic camera;
    a determining unit determining whether the lens part is located at an unsuitable position for shooting an image in which at least a portion of the aperture of the lens part is hidden by the body of the electronic camera;
    a release button setting a shooting condition when half-pressed, and executing a shooting when full-pressed; and
    a shooting inhibiting unit for inhibiting the shooting when, upon the release button being full-pressed, the determining unit determines that said at least a portion of the aperture of the lens part is located at the unsuitable position for shooting,
    wherein the shooting inhibiting unit triggers the determining by the determining unit according to the release button being full-pressed, and when it is determined that the lens part is located at the unsuitable position for shooting, the shooting inhibiting unit inhibits shooting while keeping an operation mode of the electronic camera in an imaging mode in which a display of the electronic camera is continuously updated with an image that an image pickup part of the electronic camera is imaging.

2. An electronic camera which has an imaging mode and a non-imaging mode, respectively, the electronic camera comprising:
    a lens part being position-changeably mounted on a body of the electronic camera;
    a position changing unit changing the lens part between a storage position and a shooting-possible position in accordance with a degree of rotational position changing of the lens part, the storage position being a position where an aperture of the lens part is completely covered with the body of the electronic camera and where an almost continuous flat outermost surface is formed by the lens part and the body of the electronic camera, and the shooting-possible position being a position where the aperture of the lens part is not covered with the body of the electronic camera and sticks out from the body of the electronic camera;
    a determining unit determining whether the lens part is located at an unsuitable position for shooting an image in which at least a portion of the aperture of the lens part is hidden by the body of the electronic camera;
    a release button executing shooting when pressed;
    a continuous shooting unit performing continuous shooting while the release button is being pressed; and
    a continuous shooting interrupting unit interrupting the continuous shooting by the continuous shooting unit when the release button is pressed and the determining unit determines that the lens part is located at the unsuitable position for the shooting,
    wherein when the continuous shooting is inhibited, a display of the electronic camera continues to be updated with an image that an image pickup part of the electronic camera is imaging.

3. The electronic camera according to claim 2, wherein the continuous shooting interrupting unit resumes the continuous shooting when the determining unit determines, during an interruption of the continuous shooting, that the aperture of the lens part is not located at any position unsuitable for the shooting.

* * * * *